United States Patent
Bharadwaj et al.

(10) Patent No.: US 11,166,310 B2
(45) Date of Patent: Nov. 2, 2021

(54) CHANNEL ACCESS MECHANISM FOR WIRELESS COMMUNICATIONS

(71) Applicant: QUALCOMM Incorporated, San Diego, CA (US)

(72) Inventors: Arjun Bharadwaj, Poway, CA (US); Sudhir Kumar Baghel, Hillsborough, NJ (US); Kapil Gulati, Hillsborough, NJ (US); Shailesh Patil, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 73 days.

(21) Appl. No.: 16/665,903

(22) Filed: Oct. 28, 2019

(65) Prior Publication Data

US 2020/0146061 A1 May 7, 2020

Related U.S. Application Data

(60) Provisional application No. 62/754,989, filed on Nov. 2, 2018.

(51) Int. Cl.
*H04W 74/08* (2009.01)
*H04W 4/40* (2018.01)
(Continued)

(52) U.S. Cl.
CPC ......... *H04W 74/0808* (2013.01); *H04W 4/40* (2018.02); *H04W 72/02* (2013.01); *H04W 72/0446* (2013.01); *H04W 72/0453* (2013.01)

(58) Field of Classification Search
CPC ... H04W 74/0808; H04W 72/02; H04W 4/40; H04W 4/46
See application file for complete search history.

(56) References Cited

U.S. PATENT DOCUMENTS

2017/0006594 A1* 1/2017 Wei ................... H04W 72/1242
2017/0188391 A1* 6/2017 Rajagopal ......... H04W 74/0816
(Continued)

OTHER PUBLICATIONS

Huawei, et al., "Mode 2 Resource Allocation for D2D," 3GPP Draft, 3GPP TSG RAN WGI Meeting #78, R1-142839, 3rd Generation Partnership Project (3GPP), Mobile Competence Centre, 650, Route Des Lucioles, F-06921, Sophia-Antipolis Cedex, France, vol. RAN WG1, No. Dresden, Germany, Aug. 18, 2014-Aug. 22, 2014, Aug. 18, 2014 (Aug. 18, 2014), XP050788324, 6 pages, Retrieved from the Internet: URL: http://www.3gpp.org/ftp/Meetings_3GPP_SYNC/RAN1/Docs/ [retrieved on Aug. 17, 2014], paragraph [03.1]- [03.4]; figures 1,2.

(Continued)

*Primary Examiner* — Robert C Scheibel
(74) *Attorney, Agent, or Firm* — Arent Fox, LLP

(57) ABSTRACT

In a device to device (D2D) communication scenario such as vehicle to anything (V2X) communications, channel access of a device such as a user equipment (UE) may not be controlled by network devices. Using the disclosed channel access mechanism, a device may autonomously access a channel for transportation related communications. A device may determine to transmit a data packet in a portion of bandwidth. The device may select a listen before talk counter defining a time period to wait before beginning a transmission of the data packet. The device may sense the portion of bandwidth during the time period for transmissions of other UEs occupying frequency resource blocks within the portion of bandwidth. The device may select unoccupied frequency resource blocks within the portion of bandwidth based on the sensing. The device may transmit the data packet on the unoccupied frequency resource blocks after the period of time.

24 Claims, 7 Drawing Sheets

(51) Int. Cl.
*H04W 72/02* (2009.01)
*H04W 72/04* (2009.01)

(56) References Cited

U.S. PATENT DOCUMENTS

| | | | |
|---|---|---|---|
| 2018/0070252 A1* | 3/2018 | Gupta | H04W 48/16 |
| 2018/0220455 A1 | 8/2018 | Baghel et al. | |
| 2018/0279366 A1* | 9/2018 | Harada | H04W 72/0446 |
| 2018/0302868 A1* | 10/2018 | Bhorkar | H04W 56/0005 |
| 2019/0059091 A1* | 2/2019 | Tang | H04W 72/08 |
| 2020/0029318 A1* | 1/2020 | Guo | H04L 1/1822 |
| 2020/0029340 A1* | 1/2020 | He | H04W 4/40 |
| 2020/0403735 A1* | 12/2020 | Zhao | H04L 5/0055 |
| 2021/0068154 A1* | 3/2021 | Jia | H04W 74/0816 |

OTHER PUBLICATIONS

International Search Report and Written Opinion—PCT/US2019/058592—ISA/EPO—Jan. 23, 2020.

\* cited by examiner

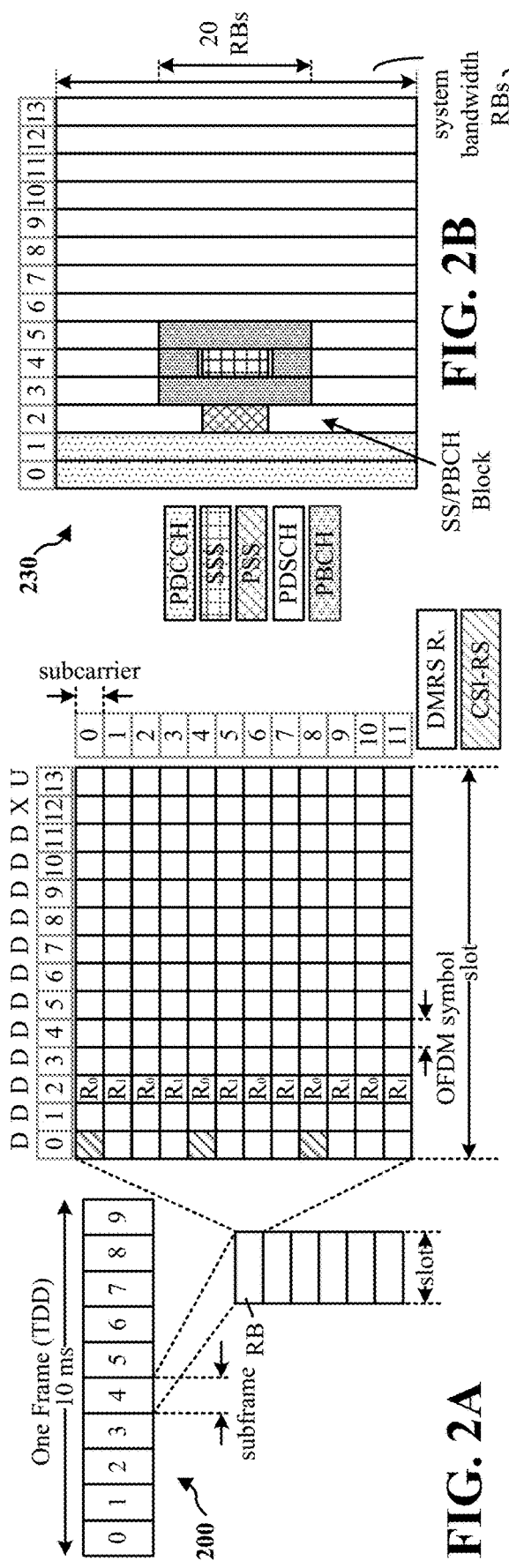
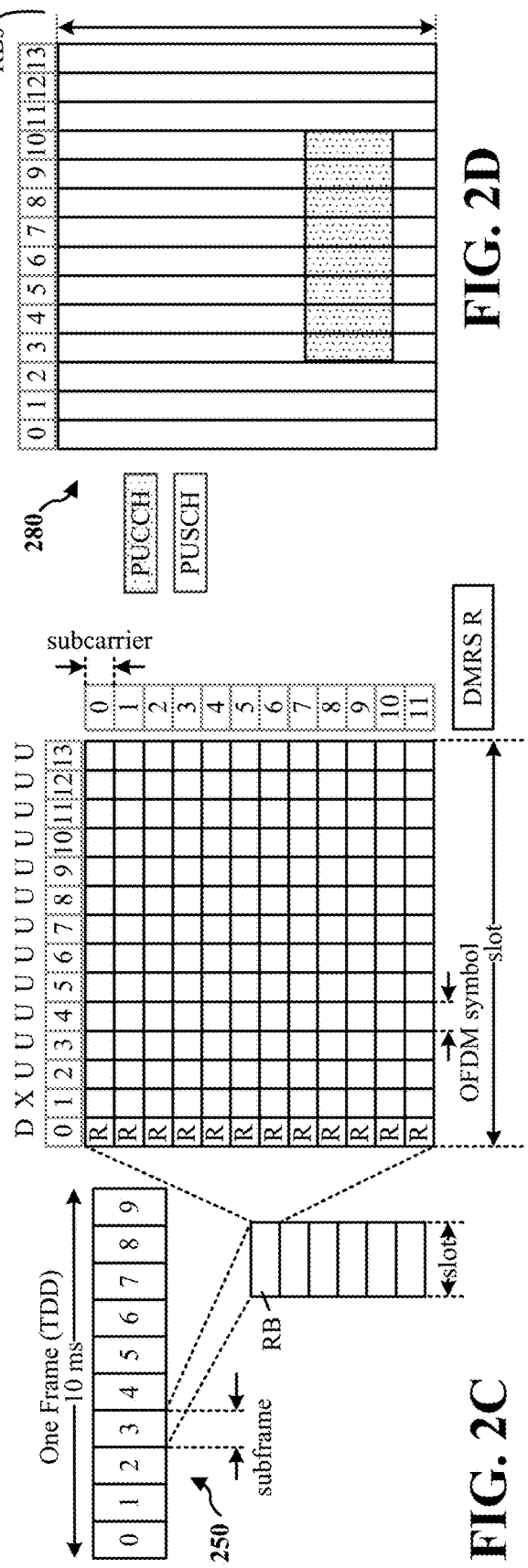
FIG. 2A
FIG. 2B
FIG. 2C
FIG. 2D

CHANNEL ACCESS MECHANISM FOR WIRELESS COMMUNICATIONS

CLAIM OF PRIORITY UNDER 35 U.S.C. § 119

This application claims priority to U.S. Provisional Application No. 62/754,989 titled "CHANNEL ACCESS MECHANISM FOR WIRELESS COMMUNICATIONS," filed Nov. 2, 2018, which is assigned to the assignee hereof, and incorporated herein by reference in its entirety.

BACKGROUND

Technical Field

The present disclosure relates generally to communication systems, and more particularly, to channel access mechanisms for wireless communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Vehicles and associated user equipment (UE) may utilize LTE or 5G NR technology for communications. Such communications may be referred to as Vehicle to Anything (V2X, or more specifically for NR-based communications, NR-V2X). A V2X system may present different desirable communication properties based on the high mobility of vehicles and ad hoc nature of transportation related communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may include determining, by the UE, to transmit a data packet in a portion of bandwidth. The method may include selecting a listen before talk counter defining a time period to wait before beginning a transmission of the data packet. The method may include sensing, during the time period, the portion of bandwidth for transmissions of other UEs occupying frequency resource blocks within the portion of bandwidth. The method may include selecting unoccupied frequency resource blocks within the portion of bandwidth based on the sensing. The method may include transmitting the data packet on the unoccupied frequency resource blocks after the time period.

In another aspect, the apparatus may be a UE. The UE may include a memory and at least one processor coupled to the memory. The processor may be configured to determine to transmit a data packet in a portion of bandwidth. The processor may be configured to select a listen before talk counter defining a time period to wait before beginning a transmission of the data packet. The processor may be configured to sense, during the time period, the portion of bandwidth for transmissions of other UEs occupying frequency resource blocks within the portion of bandwidth. The processor may be configured to select unoccupied frequency resource blocks within the portion of bandwidth based on the sensing. The processor may be configured to transmit the data packet on the unoccupied frequency resource blocks after the time period.

In another aspect, the disclosure provides a UE for wireless communication. The UE may include means for determining, by the UE, to transmit a data packet in a portion of bandwidth. The UE may include means for selecting a listen before talk counter defining a time period to wait before beginning a transmission of the data packet. The UE may include means for sensing, during the time period, the portion of bandwidth for transmissions of other UEs occupying frequency resource blocks within the portion of bandwidth. The UE may include means for selecting unoccupied frequency resource blocks within the portion of bandwidth based on the sensing. The UE may include means for transmitting the data packet on the unoccupied frequency resource blocks after the time period.

In another aspect, the disclosure provides a computer-readable medium storing computer executable code executable by a processor of a user equipment (UE). The computer-readable medium may include code to determine, at the UE, to transmit a data packet in a portion of bandwidth. The computer-readable medium may include code to select a listen before talk counter defining a time period to wait before beginning a transmission of the data packet. The computer-readable medium may include code to sense, during the time period, the portion of bandwidth for transmissions of other UEs occupying frequency resource blocks within the portion of bandwidth. The computer-readable medium may include code to select unoccupied frequency resource blocks within the portion of bandwidth based on the sensing. The computer-readable medium may include code to transmit the data packet on the unoccupied frequency resource blocks after the time period. In an aspect, the computer-readable medium may be a non-transitory computer-readable medium.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

DETAILED DESCRIPTION

Figure 1:
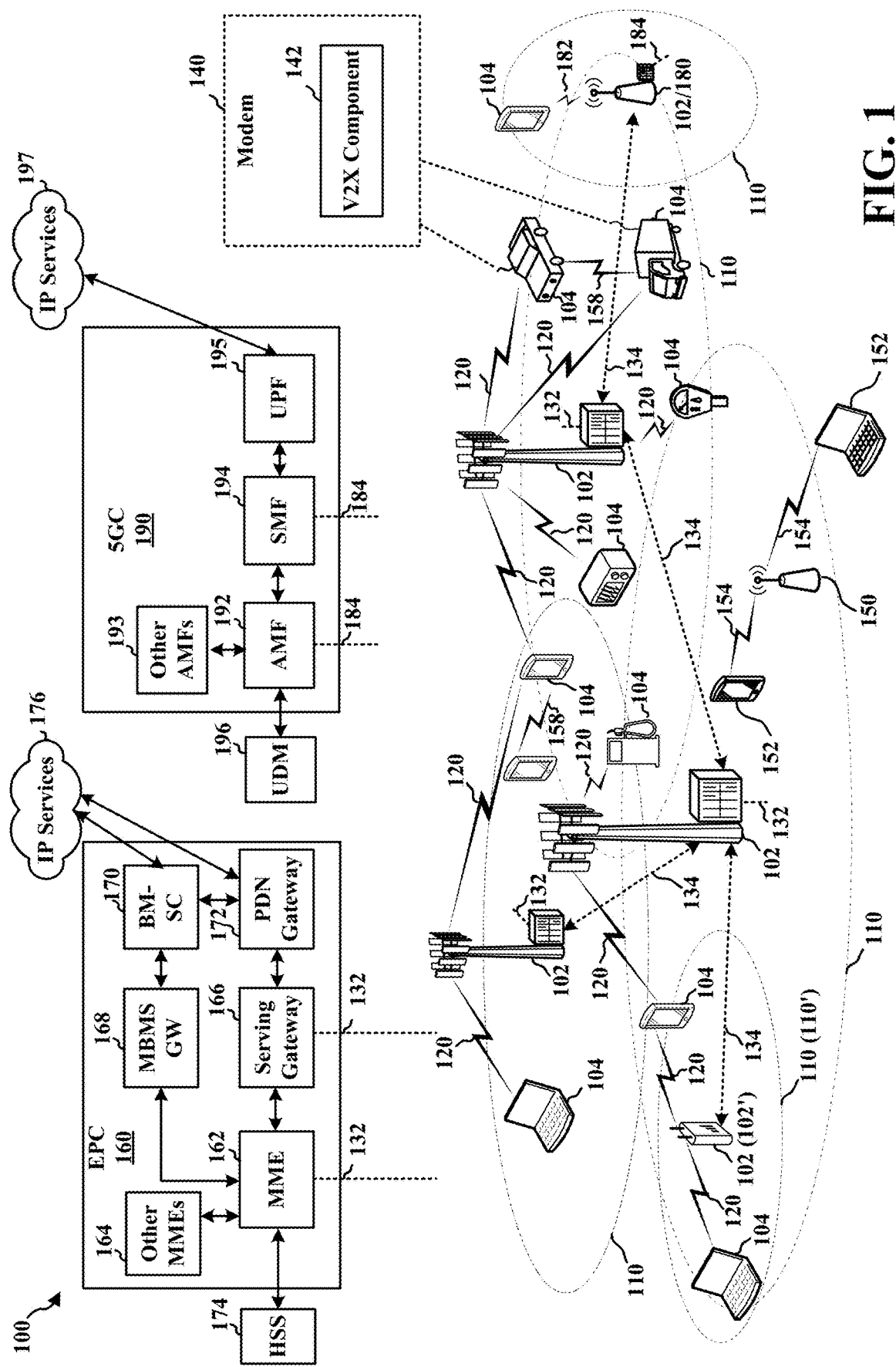
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The described features generally relate to channel access procedures for device-to-device (D2D) communication technologies. For example, D2D communication technologies can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a sidelink channel.

In an aspect, sidelink V2X communications may occur in a dedicated portion of spectrum such as the 5.9 GHz dedicated short range communications (DSRC) bandwidth reserved for vehicle communications. As such, conventional base stations may not be used to coordinate communications between vehicles. Instead, vehicles may communicate directly with each other and with transportation related infrastructure. Vehicles and associated user equipment may autonomously reserve and utilize time-frequency resources. Due to the lack of network based control and the time sensitive nature of inter-vehicle communications, resource allocation mechanisms may attempt to reduce resource collisions while also reducing latency. In an aspect, resources may be allocated using a structure similar to a 5G NR frame structure and similar terminology will be used to describe aspects herein, though the concepts and features may be similarly applied to other wireless communication technologies and corresponding frame structures.

Accordingly, aspects described herein relate to a listen before talk (LBT) based channel access mechanism where channel access is based on a counter. A UE may continuously monitor a portion of bandwidth for messages from other UEs. The messages may be, for example, safety messages including sensor information, location, imminent collision warnings, and other information related to vehicle operation. Each message or transmission may include a LBT sequence that identifies a number of resource blocks utilized for the transmission. For example, a configured sequence may be transmitted on each occupied resource block in a first symbol of the transmission. The configured sequence may be a sequence stored in memory, received in a configuration from a base station, or defined in a standards document or regulation. Each message or transmission may also include control information, which may indicate a length of the transmission as well as information for decoding a data portion of the transmission.

When a UE has a data packet to transmit, the UE may select a LBT counter. The LBT counter may indicate a time period for the UE to wait before transmitting. The time period may be less than a slot. Accordingly, channel access may occur on a sub-slot basis. For example, the LBT counter may be a number of symbols or a number of sets of symbols. In an aspect, the LBT counter may be defined as a whole number (i.e., non-negative integer) multiple of a defined number of symbols. In an aspect, the number of symbols may be at least a number of symbols used for the LBT sequence and the control data. Accordingly, a minimum number of symbols for the LBT counter may be 2 symbols. But a larger number of symbols may allow more time for decoding of the control data. For example, in an aspect, the defined number of symbols may be 8 symbols. The selection of the LBT counter may be random, or may be based on a priority of the data packet.

The UE may sense the portion of bandwidth during the time period based on the LBT counter to determine whether another UE is utilizing any resource blocks. The UE may compare a received LBT sequence to defined sequences to determine a number of resource blocks utilized. The UE may also correlate the LBT sequence to each resource block to determine which resource blocks are utilized. Additionally, the UE may receive and decode the control data to determine a duration that the other UE is utilizing the resource blocks.

The UE may begin a transmission after an LBT period indicated by the LBT counter. The LBT period may end in the middle of a slot. Accordingly, the UE may start a sub-slot transmission after the LBT period. The UE may select available resource blocks for the transmission based on the sensing during the LBT period. The number of resource blocks may depend on a size of the data packet, a modulation scheme, and a transmission length. In an aspect, the transmission length may be a multiple of a slot or transmission time interval (TTI). In one example, a TTI can include one or more symbols (e.g., orthogonal frequency division multiplexing (OFDM) symbols), and/or a slot can include multiple symbols. In another aspect, a lower coding rate may be used to achieve a transmission length such that the transmission ends at a slot boundary.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW gNB 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving.

Referring again to FIG. 1, in certain aspects, the UE 104 may be located within a vehicle and configured for V2X communications. In aspects described herein, UE 104 can include a modem 140 for communicating with other UEs and/or base stations in a wireless network. The modem 140 may also be used for the V2X communications. For example, the UE 104 or modem 140 may include a V2X component 142 for determining channel access to a dedicated V2X channel and transmitting a data packet according to the determined channel access, as described further herein.

Figure 4:
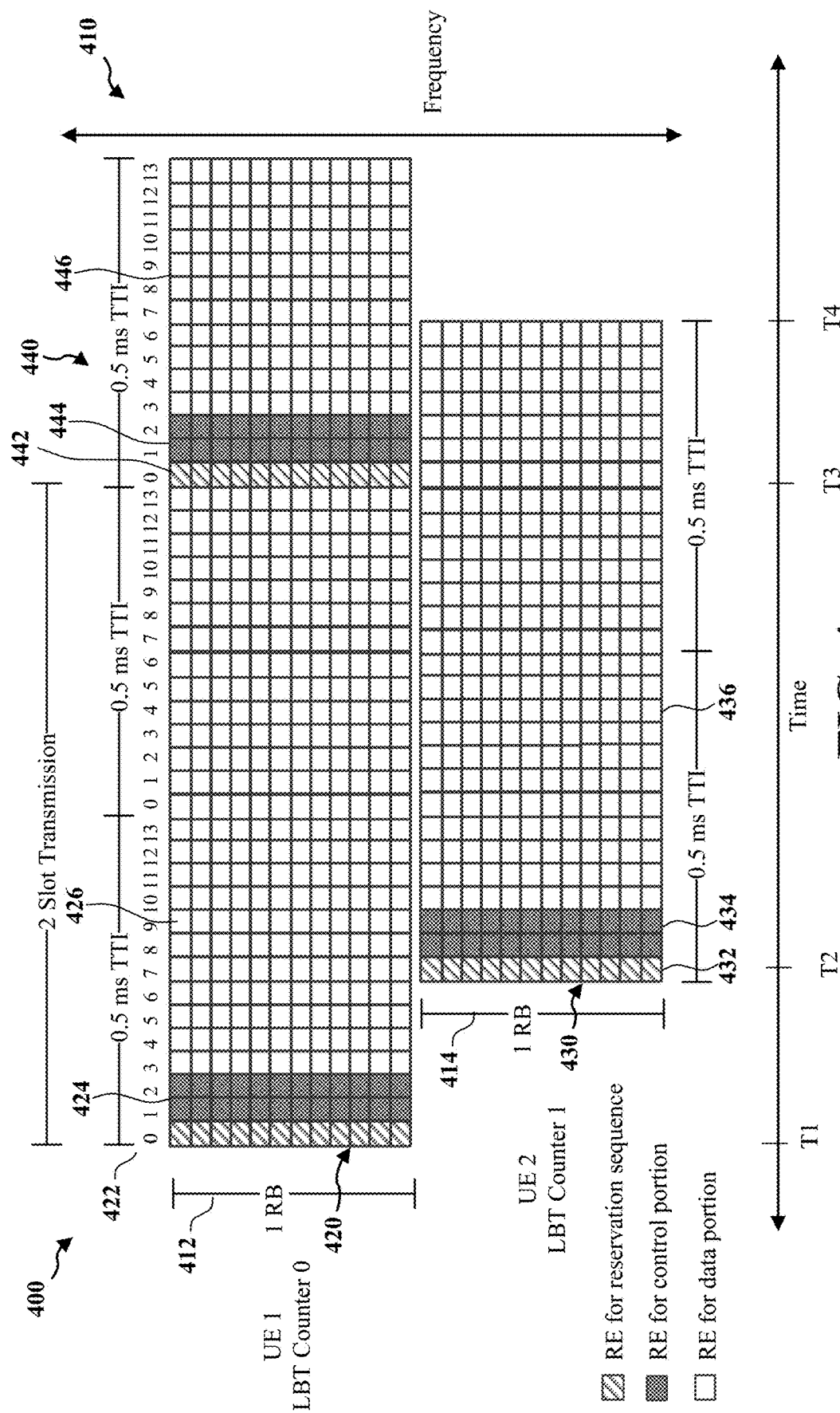
FIG. 4 is a resource diagram illustrating an example of channel access with equal code rates, in accordance with various aspects of the present disclosure.
Figure 5:
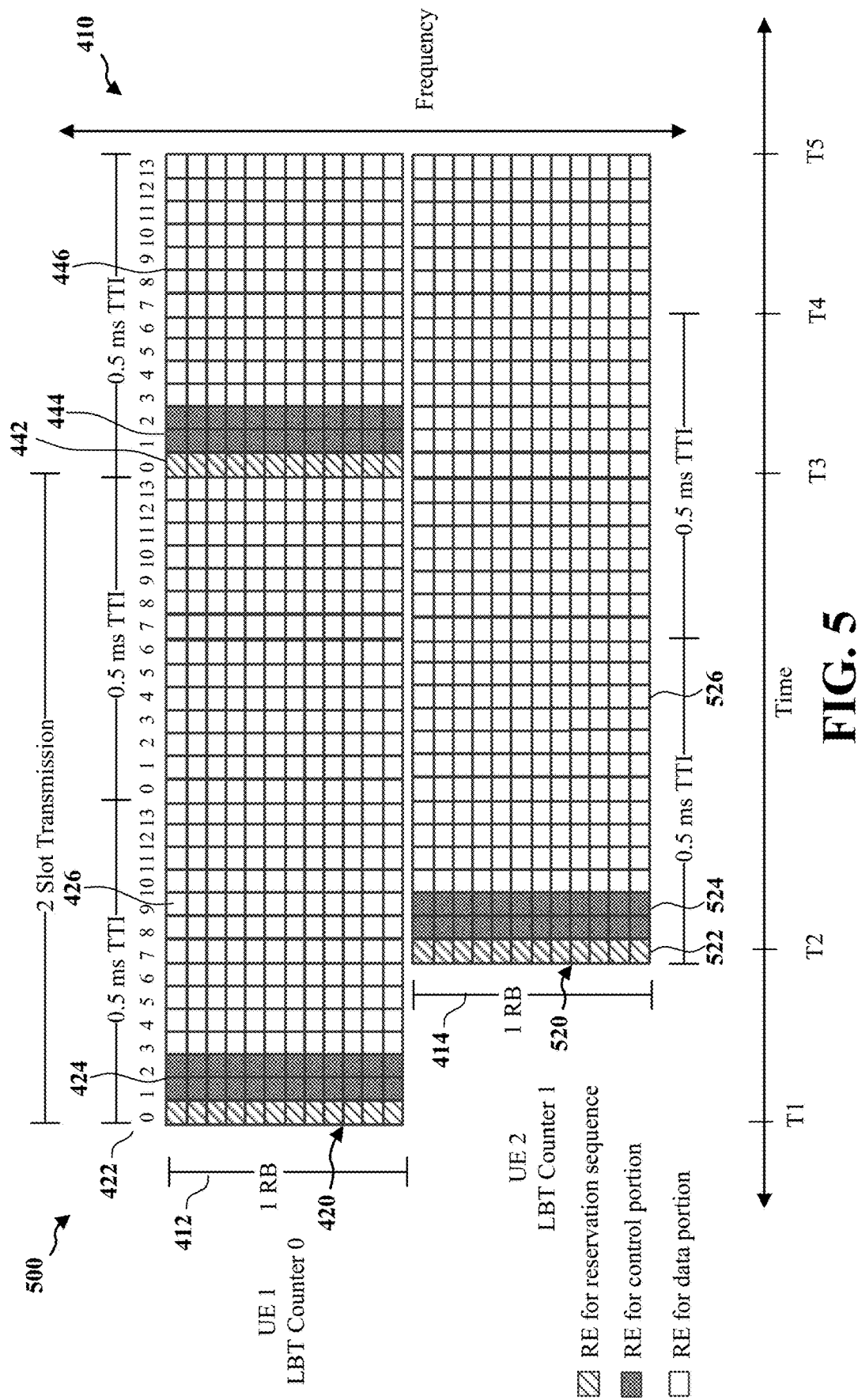
FIG. 5 is another resource diagram illustrating an example of channel access with different code rates, in accordance with various aspects of the present disclosure.
Figure 6:
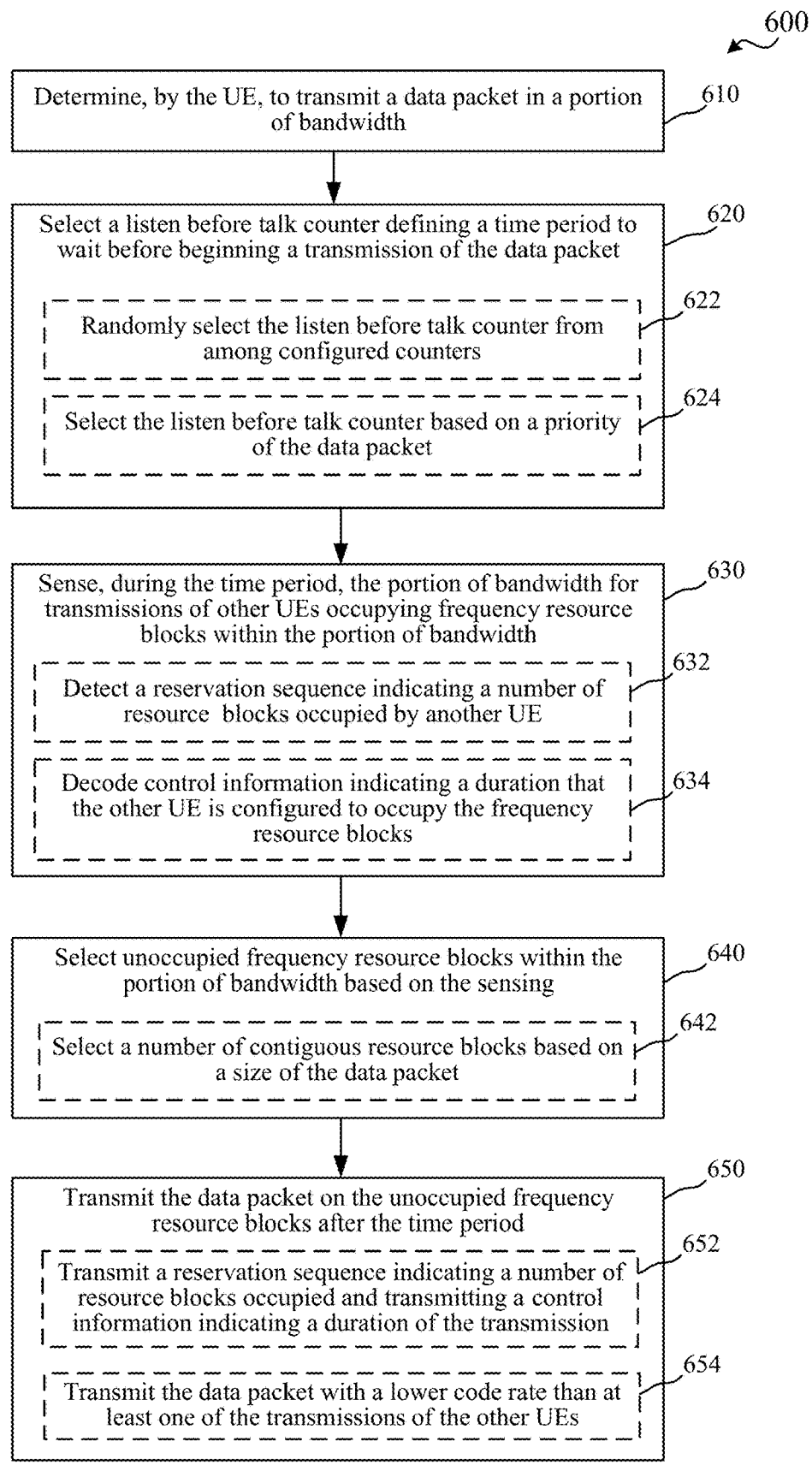
FIG. 6 is a flowchart illustrating an example method of channel access, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIG. 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 2A is a diagram 200 illustrating an example of a first slot within a 5G/NR frame structure. FIG. 2B is a diagram 230 illustrating an example of DL channels within a 5G/NR slot. FIG. 2C is a diagram 250 illustrating an example of a second slot within a 5G/NR frame structure. FIG. 2D is a diagram 280 illustrating an example of UL channels within a 5G/NR slot. The 5G/NR frame structure may be FDD in which for a particular set of subcarriers (carrier system bandwidth), slots within the set of subcarriers are dedicated for either DL or UL, or may be TDD in which for a particular set of subcarriers (carrier system bandwidth), slots within the set of subcarriers are dedicated for both DL and UL. In the examples provided by FIGS. 2A, 2C, the 5G/NR frame structure is assumed to be TDD, with slot 4 being configured with slot format 28 (with mostly DL), where D is DL, U is UL, and X is flexible for use between DL/UL, and slot 3 being configured with slot format 34 (with mostly UL). While slots 3, 4 are shown with slot formats 34, 28, respectively, any particular slot may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a slot of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular slots of a frame. The PSS is used by a UE 104 to determine slot/symbol timing and a physical layer identity. A secondary synchronization signal (SSS) may be within symbol 4 of particular slots of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a slot of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
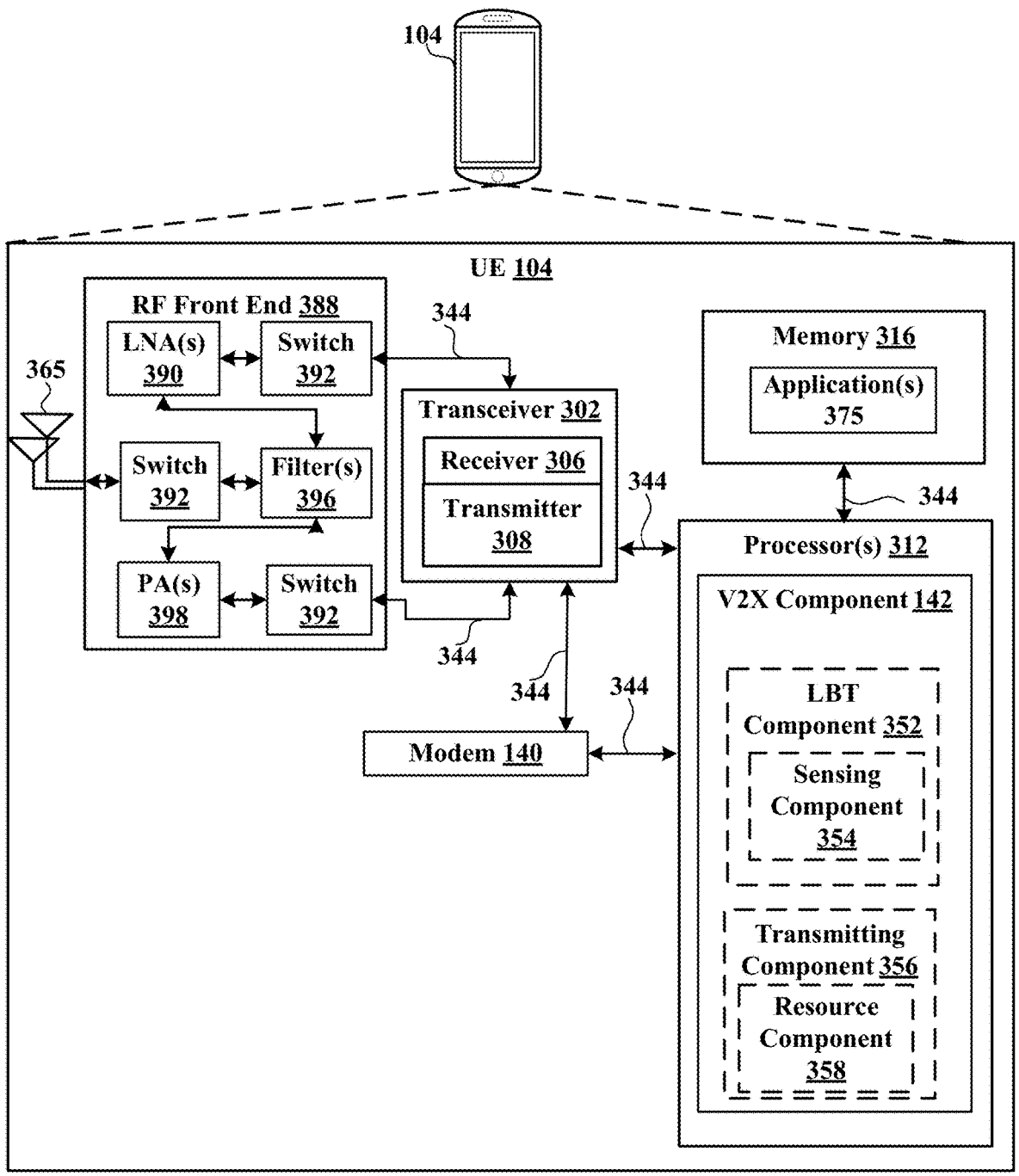
FIG. 3 is a block diagram illustrating an example of a UE, in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 140 and/or V2X component 142 to enable one or more of the functions described herein related to determining channel access to a dedicated V2X channel and transmitting a data packet according to the determined channel access.

In an aspect, the one or more processors 312 can include a modem 140 and/or can be part of the modem 140 that uses one or more modem processors. Thus, the various functions related to V2X component 142 may be included in modem 140 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 140 associated with V2X component 142 may be performed by transceiver 302.

Also, memory 316 may be configured to store data used herein and/or local versions of applications 375 or V2X component 142 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining V2X component 142 and/or one or more of its subcomponents, and/or data associated therewith, when UE 104 is operating at least one processor 312 to execute V2X component 142 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may include, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. The antennas 365 may include one or more antennas, antenna elements, and/or antenna arrays. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 302 to operate at a specified frequency and power level based on the UE configuration of the UE 104 and the communication protocol used by modem 140.

In an aspect, modem 140 can be a multiband-multimode modem, which can process digital data and communicate with transceiver 302 such that the digital data is sent and received using transceiver 302. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, V2X component 142 may optionally include a listen before talk (LBT) component 352 for selecting an LBT counter and/or for sensing the channel during an LBT period prior to transmitting. The V2X component 142 may optionally include a transmitting component 356 for transmitting a data packet on resources determined based on the sensing.

The LBT component 352 may select a LBT counter for each transmission from the UE 104 on the V2X channel. In an aspect, the LBT component 352 may randomly or pseudorandomly select the LBT counter from a set of configured LBT counters with equal (or at least substantially equal) probability. Randomly selecting the LBT counter may reduce the likelihood of collision occurring due to two UEs attempting to transmit on the same resources at the same time. In another aspect, the LBT component 352 may select the LBT counter based at least in part on a priority of the transmission. For example, a transmission including an imminent collision warning may have a higher priority than a weather report, and the LBT component 352 may be allowed to select a lower LBT counter (e.g., resulting in less or no waiting) for the higher priority transmission. Lower priority transmissions may have a higher minimum LBT counter. Randomization of the LBT counter may still be used with priorities to help prevent collision of high priority transmissions.

The LBT component 352 may include a sensing component 354. The sensing component 354 may be configured to sense the V2X channel during the LBT period. In particular, the sensing component 354 may include or control a radio receiver to detect a reservation sequence and a control portion of a transmission. The sensing component 354 may determine how many resource blocks are occupied based on the reservation sequence. The sensing component 354 may determine a duration of a transmission based on the control portion. Accordingly, the sensing component 354 may determine which resources are occupied by transmissions from other UEs.

The transmitting component 356 may include or control a radio transmitter configured to transmit a data packet on resources determined via the channel access procedures. The transmitting component 356 may include a resource component 358 configured to determine available unoccupied resources. For example, the resource component 358 may determine the available unoccupied resources based on the occupied resources determined by the sensing component 354. The transmitting component 356 may determine a number of resource blocks in the frequency domain and a number of transmission time intervals (TTI) or slots in the time domain for a transmission based on a size of a data packet to be transmitted and a modulation scheme (e.g., QPSK or 16QAM). Table 1 provides an example of resources that may be used for various data packet sizes.

TABLE 1

| Packet Size | QPSK | | 16QAM | |
|---|---|---|---|---|
| [Bytes] | RBs | TTIs | RBs | TTIs |
| 200 | 20 | 1 | 10 | 1 |
| 400 | 15 | 2 | 15 | 1 |
| 600 | 20 | 2 | 20 | 1 |
| 800 | 25 | 2 | 25 | 1 |
| 1000 | 20 | 3 | 30 | 1 |

TABLE 1-continued

| Packet Size | QPSK | | 16QAM | |
|---|---|---|---|---|
| [Bytes] | RBs | TTIs | RBs | TTIs |
| 1200 | 25 | 3 | 15 | 2 |
| 1400 | 20 | 4 | 20 | 2 |
| 1600 | 25 | 4 | 25 | 2 |
| 1800 | 20 | 5 | 25 | 2 |
| 2000 | 25 | 5 | 25 | 2 |

In an aspect, the processor(s) 312 may correspond to one or more of the processors described in connection with the UE in FIG. 7. Similarly, the memory 316 may correspond to the memory described in connection with the UE in FIG. 7.

FIG. 4 is a resource diagram 400 showing an example of how two UEs may access resource blocks 412, 414 of a dedicated channel 410. The dedicated channel 410 may be defined as a portion of bandwidth or frequency band. For example, the dedicated channel 410 may utilize the 5.9 GHz band for dedicated vehicle communications, or another frequency band. Although only two resource blocks 412, 414 are illustrated, it should be appreciated that the dedicated channel 410 may include a series of consecutive resource blocks. For example, a 20 MHz band may include 50 consecutive resource blocks, each including 12 subcarriers.

In this example, a first UE1 and a second UE2 may determine to transmit respective data packets at approximately the same time. The first UE1 and the second UE2 may have been monitoring the dedicated channel 410 and have determined that at least resource blocks 412 and 414 are unoccupied. That is, the UEs may determine that no other UE has reserved the resource blocks 412, 414 at the time T1, which may be the start of a slot. Each of the first UE1 and the second UE2 may select an LBT counter. The LBT counter may be defined to indicate a number of symbols (k) that the UE waits before beginning a transmission using unoccupied resource blocks. The minimum value of k may be 3 to allow a UE to receive a reservation sequence and a control channel if transmitted by another UE. In an aspect, LBT counters may be defined as a whole number multiple of k. For example, as illustrated, k may be 7, so using LBT counter 1, the second UE2 may wait 7 symbols and begin a transmission at the 8th symbol.

The first UE1 may select an LBT counter 0, which may have a duration of 0, which is 0 times k. In other words, the first UE1 may begin a transmission 420 using unoccupied resources without waiting. The first UE1 may begin the transmission 420 using resource block 412 (and/or other resource blocks not shown), but not using resource block 414. The transmission 420 may include a reservation sequence 422, a control portion 424, and a data portion 426. A total length of the transmission may be 2 slots, and the transmission 420 may end at time T3.

In contrast to the first UE1, the second UE2 may select an LBT counter 1, which may have a duration of 7 symbols, which is 1 times k. The second UE2 may sense the channel 410 during the LBT period of 7 symbols. The second UE2 may detect the reservation sequence 422 and determine that the resource block 412 and other resource blocks are occupied, but the resource block 414 is unoccupied. The second UE2 may determine the length of the transmission from the first UE1 based on the control portion 424. At time T2, when a duration corresponding the LBT counter 1 is over, the second UE2 may begin a transmission 430 on resource block 414 and other unoccupied resource blocks (not shown).

Similar to the transmission 420, the transmission 430 may include a reservation sequence 432, a control portion 434, and a data portion 436. The transmission 430 may include the same size data packet as in the transmission 420, and the transmission 430 may end at time T4, 2 slots after T2.

In an aspect, another UE may begin a transmission when resource blocks are unoccupied. For example, at time T3, a third UE3 may begin a transmission 440. The UE3 may, for example, select a LBT counter 0, and start the transmission 440 as soon as UE1 is done occupying the resources (e.g., based on the control portion 424). The transmission 440 may include the reservation sequence 442, the control portion 444, and the data portion 446. Alternatively, if UE3 were to select a longer LBT counter, the transmission 440 may begin at a later time, or another UE with a lower LBT counter may begin a transmission on the resource block 412 instead.

FIG. 5 is a resource diagram 500 showing another example of how two UEs may access resource blocks 412, 414 of the dedicated channel 410. In this example, the first UE1 may operate in the same manner as described above with respect to FIG. 4. The second UE2, may select the same LBT counter 1 and begin a transmission 520 at time T2. In this example, however, the UE2 may use a different code rate to align the end of transmission 520 with the end of the slot at time T5. The reservation sequence 522 and the control portion 524 may use the same number of symbols as before. By using a lower code rate, the UE2 may generate more bits for the data portion 526 to occupy the resource block 414 for a longer duration. Accordingly, the transmission 520 and the transmission 440 may end at time T5. Adjusting the code rate such that transmissions end at slot boundaries may prevent segmentation of the resource blocks and allow UEs having larger transmissions to transmit using multiple contiguous resource blocks. For example, at time T5, a UE may start a transmission using both resource block 412 and resource block 414.

FIG. 6 illustrates a flow chart of an example of a method 600 for determining channel access for transmitting wireless communications. In an example, a UE 104 may perform the functions described in method 600 using one or more of the components described in FIGS. 1, 3, and 7.

In method 600, at block 610, a UE may determine to transmit a data packet in a portion of bandwidth. In an aspect, for example, the UE 104, the processor 312, the TX processor 720, and/or the processor 740 may execute the V2X component 142 to determine to transmit a data packet in a portion of bandwidth, e.g., in conjunction with memory 316, transceiver 302, etc. In an aspect, for example, an application 375 may generate the data packet for the V2X component 142 to transmit. Accordingly, the UE 104, the processor 312, and/or the TX processor 720, and/or the processor 740 executing the V2X component 142 may provide means for determining to transmit a data packet in a portion of bandwidth.

In block 620, the method 600 may include selecting a listen before talk counter defining a time period to wait before beginning a transmission of the data packet. In an aspect, for example, the UE 104, the processor 312, the TX processor 720, and/or the processor 740 may execute the V2X component 142 and/or the LBT component 352 to select a listen before talk counter (e.g., LBT counter 0 or LBT counter 1) defining a time period to wait before beginning a transmission of the data packet. In sub-block 622, selecting the listen before talk counter may include randomly selecting the listen before talk counter from among configured counters. For instance, the LBT component 352 may be configured with a set of counters, which may be defined by configuration information received from a base station or in a standards document or regulation. In an aspect, the LBT component 352 may assign each counter an equal weight and randomly select one of the counters, for example, using a random number generator. In sub-block 624, selecting the listen before talk counter may include selecting the listen before talk counter based on a priority of the data packet. In an aspect, for example, LBT component 352 may select the listen before talk counter based on the priority of the data packet. For instance, the LBT component 352 may restrict the set of listen before talk counters available for selection based on the priority of the data packet. Accordingly, the UE 104, the processor 312, and/or the TX processor 720, and/or the processor 740 executing the V2X component 142 and/or the LBT component 352 may provide means for selecting a listen before talk counter defining a time period to wait before beginning a transmission of the data packet.

In block 630, the method 600 may include sensing, during the time period, the portion of bandwidth for transmissions of other UEs occupying frequency resource blocks within the portion of bandwidth. In an aspect, for example, the UE 104, the processor 312, the RX processor 738, and/or the processor 740 may execute the V2X component 142 and/or the sensing component 354 to sense, during the time period (e.g., T1 to T2 in FIGS. 4 and 5), the portion of bandwidth (e.g., channel 410) for transmissions of other UEs occupying frequency resource blocks (e.g., resource blocks 412, 414) within the portion of bandwidth. For example, in sub-block 632, sensing the portion of bandwidth may include detecting a reservation sequence indicating a number of resource blocks occupied by another UE. The sensing component 354 may receive a signal over the portion of bandwidth and correlate the received signal against defined reservation sequences to determine which reservation sequence was transmitted. In another aspect, in sub-block 634, sensing the portion of bandwidth may include decoding control information indicating a duration for which the other UE is configured to occupy the frequency resource blocks. For example, the sensing component 354 may receive control portion 424. The sensing component 354 may decode the control portion 424 according to a control format to determine the duration indicated by the control portion 424. Accordingly, the UE 104, the processor 312, and/or the RX processor 738, and/or the processor 740 executing the V2X component 142 and/or the sensing component 354 may provide means for sensing, during the time period, the portion of bandwidth for transmissions of other UEs occupying frequency resource blocks within the portion of bandwidth.

In block 640, the method 600 may include selecting unoccupied frequency resource blocks within the portion of bandwidth based on the sensing. In an aspect, for example, the UE 104, the processor 312, the RX processor 738, and/or the processor 740 may execute the V2X component 142 and/or the resource component 358 to select unoccupied frequency resource blocks (e.g., resource block 414) within the portion of bandwidth (e.g., channel 410) based on the sensing. The resource component 358 may, for example, determine that any resource blocks that are not occupied by an ongoing transmission are unoccupied frequency resource blocks. For example, in sub-block 642, selecting the unoccupied frequency resource blocks may include selecting a number of contiguous resource blocks based on a size of the data packet. For instance, the resource component 358 may select the number of contiguous resource blocks based on the size of the data packet according to Table 1. The resource component 358 may also base the selection on a modulation scheme to be used for the transmission. Accordingly, the UE 104, the processor 312, and/or the RX processor 738, and/or the processor 740 executing the V2X component 142 and/or the resource component 358 may provide means for selecting unoccupied frequency resource blocks within the portion of bandwidth based on the sensing.

In block 650, the method 600 may include transmitting the data packet on the unoccupied frequency resource blocks after the time period. In an aspect, for example, the UE 104, the processor 312, the TX processor 720, and/or the processor 740 may execute the V2X component 142 and/or the transmitting component 356 to transmit the data packet on the unoccupied frequency resource blocks after the time period. For example, in sub-block 652, transmitting the data packet may include transmitting a reservation sequence indicating a number of resource blocks occupied and transmitting a control information indicating a duration of the transmission. For instance, the transmitting component 356 may transmit the reservation sequence 432 and the control portion 434. The transmitting component 356 may also transmit the data portion 436 including the data packet. In another aspect, in sub-block 654, transmitting the data packet may include transmitting the data packet with a lower code rate than at least one of the transmissions of the other UEs. For example, the transmitting component 356 may transmit the data portion 526, which may use a lower code rate than the data portion 426. Accordingly, the data portion 526 may end at a slot boundary at time T5. In view of the foregoing, the UE 104, the processor 312, the TX processor 720, and/or the processor 740 executing the V2X component 142 and/or the transmitting component 356 may provide means for transmitting the data packet on the unoccupied frequency resource blocks after the time period.

Figure 7:
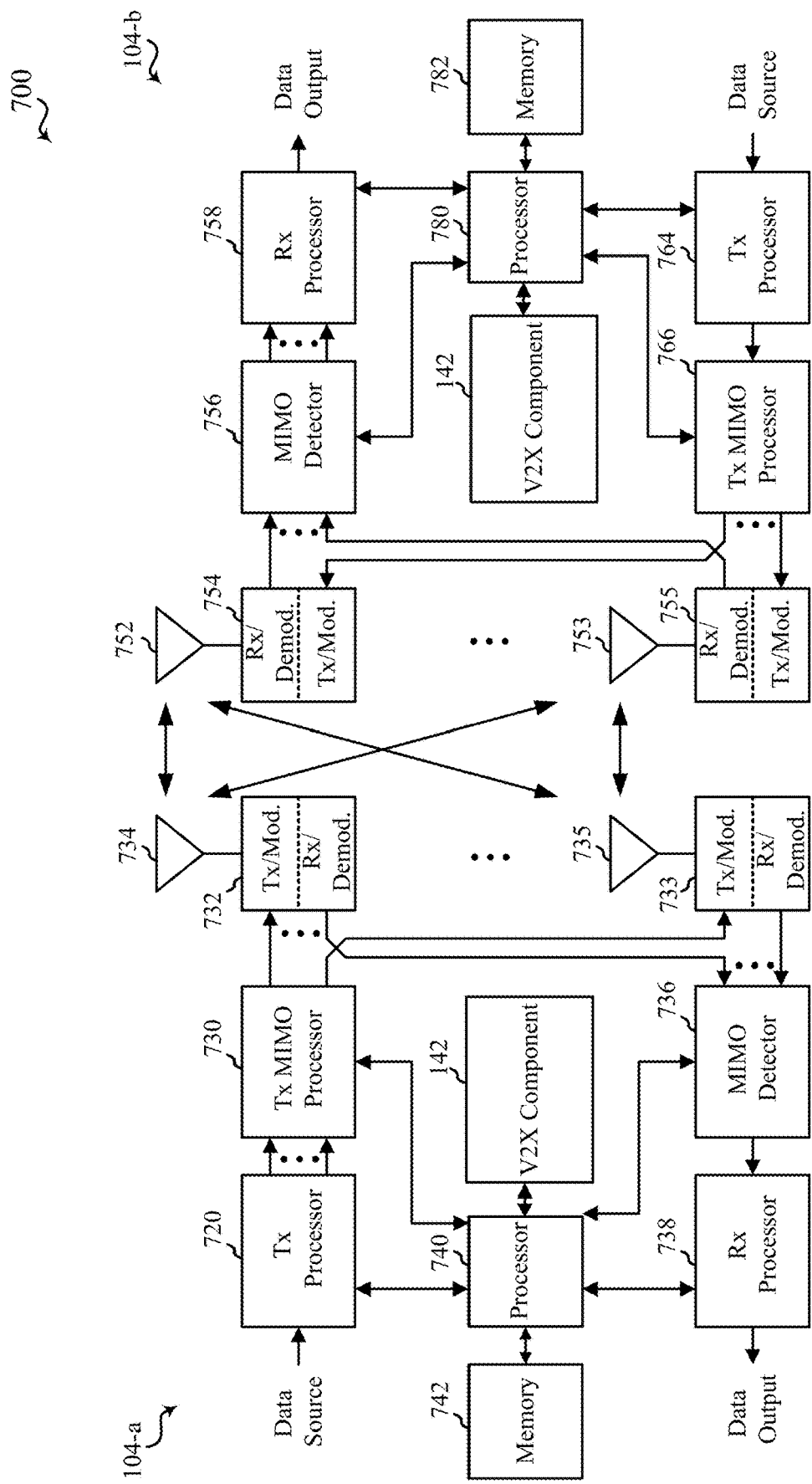
FIG. 7 is a block diagram illustrating an example of a MIMO communication system including at least two UEs, in accordance with various aspects of the present disclosure.

FIG. 7 is a block diagram of a MIMO communication system 700 including UEs 104-a, 104-b. The MIMO communication system 700 may illustrate aspects of the wireless communication access network 100 described with reference to FIG. 1. The UE 104-a may be an example of aspects of the UE 104 described with reference to FIGS. 1 and 3. The UE 104-a may be equipped with antennas 734 and 735, and the UE 104-b may be equipped with antennas 752 and 753. In the MIMO communication system 700, the UEs 104-a, 104-b may be able to send data over multiple communication links at the same time. Each communication link may be called a "layer" and the "rank" of the communication link may indicate the number of layers used for communication. For example, in a 2×2 MIMO communication system where UE 104-a transmits two "layers," the rank of the communication link between the UE 104-a and the UE 104-b is two.

At the UE 104-a, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104-b may be an example of aspects of the UEs 104 described with reference to FIGS. 1 and 3. At the UE 104-b, the UE antennas 752 and 753 may receive the signals from the UE 104-a (e.g., over a sidelink) and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive ($R_x$) processor 758 may process (e.g., demodulate, deinterleave, and decode) the detected symbols, providing decoded data for the UE 104-b to a data output, and provide decoded control information to a processor 780, or memory 782.

The processor 780 may in some cases execute stored instructions to instantiate a V2X component 142 (see e.g., FIGS. 1 and 3).

At the UE 104-b, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the UE 104-a in accordance with the communication parameters received from the UE 104-a. At the UE 104-a, the signals from the UE 104-b may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a V2X component 142 (see e.g., FIGS. 1 and 3).

The components of the UEs 104-a, 104-b may, individually or collectively, be implemented with one or more ASICs adapted to perform some or all of the applicable functions in hardware. Each of the noted modules may be a means for performing one or more functions related to operation of the MIMO communication system 700. Similarly, the components of the UE 104-a may, individually or collectively, be implemented with one or more ASICs adapted to perform some or all of the applicable functions in hardware. Each of the noted components may be a means for performing one or more functions related to operation of the MIMO communication system 700.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

SOME FURTHER EXAMPLE EMBODIMENTS

An example method of wireless communication for a user equipment (UE), comprising: determining, by the UE, to transmit a data packet in a portion of bandwidth; selecting a listen before talk counter defining a time period to wait before beginning a transmission of the data packet; sensing, during the time period, the portion of bandwidth for transmissions of other UEs occupying frequency resource blocks within the portion of bandwidth; selecting unoccupied frequency resource blocks within the portion of bandwidth based on the sensing; and transmitting the data packet on the unoccupied frequency resource blocks after the time period.

The above example method, wherein selecting the listen before talk counter comprises randomly selecting the listen before talk counter from among configured counters.

Any of the above example methods, wherein selecting the listen before talk counter is based on a priority of the data packet.

Any of the above example methods, wherein sensing the portion of bandwidth during the time period comprises detecting a reservation sequence indicating a number of the frequency resource blocks occupied by another UE.

Any of the above example methods, wherein sensing the portion of bandwidth during the time period comprises decoding control information indicating a duration that one of the other UEs is configured to occupy the frequency resource blocks.

Any of the above example methods, wherein transmitting the data packet on the unoccupied frequency resource blocks comprises transmitting the data packet with a lower code rate than at least one of the transmissions of the other UEs.

Any of the above example methods, wherein selecting unoccupied frequency resource blocks comprises selecting a number of contiguous resource blocks based on a size of the data packet.

Any of the above example methods, wherein transmitting the data packet on the unoccupied frequency resource blocks comprises transmitting a reservation sequence indicating a number of resource blocks occupied and transmitting a control information indicating a duration of the transmission.

Any of the above example methods, wherein the time period is less than a duration of a slot.

Any of the above example methods, wherein the time period is at least 2 symbols.

A first example UE for wireless communication, comprising: a memory; and at least one processor coupled to the memory and configured to: determine to transmit a data packet in a portion of bandwidth; select a listen before talk counter defining a time period to wait before beginning a transmission of the data packet; sense, during the time period, the portion of bandwidth for transmissions of other UEs occupying frequency resource blocks within the portion of bandwidth; select unoccupied frequency resource blocks within the portion of bandwidth based on the sensing; and transmit the data packet on the unoccupied frequency resource blocks after the time period.

The above first example UE, wherein the at least one processor is configured to randomly select the listen before talk counter from among configured counters.

Any of the above first example UEs, wherein the at least one processor is configured to select the listen before talk counter based on a priority of the data packet.

Any of the above first example UEs, wherein the at least one processor is configured to detect a reservation sequence indicating a number of the frequency resource blocks occupied by another UE.

Any of the above first example UEs, wherein the at least one processor is configured to decode control information indicating a duration that one of the other UEs is configured to occupy the frequency resource blocks.

Any of the above first example UEs, wherein the at least one processor is configured to transmit the data packet with a lower code rate than at least one of the transmissions of the other UEs.

Any of the above first example UEs, wherein the at least one processor is configured to select a number of contiguous resource blocks based on a size of the data packet.

Any of the above first example UEs, wherein the at least one processor is configured to transmit a reservation sequence indicating a number of resource blocks occupied and transmit a control information indicating a duration of the transmission.

Any of the above first example UEs, wherein the time period is less than a duration of a slot.

Any of the above first example UEs, wherein the time period is at least 2 symbols.

A second example UE for wireless communication, comprising: means for determining, by the UE, to transmit a data packet in a portion of bandwidth; means for selecting a listen before talk counter defining a time period to wait before beginning a transmission of the data packet; means for sensing, during the time period, the portion of bandwidth for transmissions of other UEs occupying frequency resource blocks within the portion of bandwidth; means for selecting unoccupied frequency resource blocks within the portion of bandwidth based on the sensing; and means for transmitting the data packet on the unoccupied frequency resource blocks after the time period.

The above second example UE, wherein the means for selecting the listen before talk counter is configured to randomly select the listen before talk counter from among configured counters.

Any of the above second example UEs, wherein selecting the listen before talk counter is based on a priority of the data packet.

Any of the above second example UEs, wherein the means for sensing the portion of bandwidth during the time period is configured to detect a reservation sequence indicating a number of the frequency resource blocks occupied by another UE.

Any of the above second example UEs, wherein the means for sensing the portion of bandwidth during the time period is configured to decode control information indicating a duration that one of the other UEs is configured to occupy the frequency resource blocks.

Any of the above second example UEs, wherein the means for transmitting the data packet on the unoccupied frequency resource blocks is configured to transmit the data packet with a lower code rate than at least one of the transmissions of the other UEs.

Any of the above second example UEs, wherein the means for selecting unoccupied frequency resource blocks is configured to select a number of contiguous resource blocks based on a size of the data packet.

Any of the above second example UEs, wherein the means for transmitting the data packet on the unoccupied frequency resource blocks is configured to transmit a reservation sequence indicating a number of resource blocks occupied and transmitting a control information indicating a duration of the transmission.

Any of the above second example UEs, wherein the time period is less than a duration of a slot.

Any of the above second example UEs, wherein the time period is at least 2 symbols.

An example non-transitory computer-readable medium storing computer executable code executable by a processor of a UE, comprising code to: determine, at the UE, to transmit a data packet in a portion of bandwidth; select a listen before talk counter defining a time period to wait before beginning a transmission of the data packet; sense, during the time period, the portion of bandwidth for transmissions of other UEs occupying frequency resource blocks within the portion of bandwidth; select unoccupied frequency resource blocks within the portion of bandwidth based on the sensing; and transmit the data packet on the unoccupied frequency resource blocks after the time period.

The above non-transitory computer-readable medium, wherein the code to select a listen before talk counter is executable to randomly select the listen before talk counter from among configured counters.

Any of the above non-transitory computer-readable mediums, wherein the code to select a listen before talk counter is executable to select the listen before talk counter based on a priority of the data packet.

Any of the above non-transitory computer-readable mediums, wherein the code to sense the portion of bandwidth is executable to detect a reservation sequence indicating a number of the frequency resource blocks occupied by another UE.

Any of the above non-transitory computer-readable mediums, wherein the code to sense the portion of bandwidth is executable to decode control information indicating a duration that one of the other UEs is configured to occupy the frequency resource blocks.

Any of the above non-transitory computer-readable mediums, wherein the code to transmit the data packet is executable to transmit the data packet with a lower code rate than at least one of the transmissions of the other UEs.

Any of the above non-transitory computer-readable mediums, wherein the code to select unoccupied frequency resource blocks is executable to select a number of contiguous resource blocks based on a size of the data packet.

Any of the above non-transitory computer-readable mediums, wherein the code to transmit the data packet is executable to transmit a reservation sequence indicating a number of resource blocks occupied and transmit a control information indicating a duration of the transmission.

Any of the above non-transitory computer-readable mediums, wherein the time period is less than a duration of a slot.

Any of the above non-transitory computer-readable mediums, wherein the time period is at least 2 symbols.

What is claimed is:

1. A method of wireless communication for a user equipment (UE), comprising:
    determining, by the UE, to transmit a data packet in a portion of bandwidth;
    selecting a listen before talk counter defining a time period to wait before beginning a transmission of the data packet;
    sensing, during the time period, the portion of bandwidth for transmissions of other UEs occupying frequency resource blocks within the portion of bandwidth, wherein sensing the portion of bandwidth during the time period comprises detecting a reservation sequence indicating a number of the frequency resource blocks occupied by another UE and decoding control information indicating a duration that one of the other UEs is configured to occupy the frequency resource blocks;
    selecting unoccupied frequency resource blocks within the portion of bandwidth based on the sensing; and
    transmitting the data packet on the unoccupied frequency resource blocks after the time period.

2. The method of claim 1, wherein selecting the listen before talk counter comprises randomly selecting the listen before talk counter from among configured counters.

3. The method of claim 1, wherein selecting the listen before talk counter is based on a priority of the data packet.

4. The method of claim 1, wherein transmitting the data packet on the unoccupied frequency resource blocks comprises transmitting the data packet with a lower code rate than at least one of the transmissions of the other UEs.

5. The method of claim 1, wherein selecting unoccupied frequency resource blocks comprises selecting a number of contiguous resource blocks based on a size of the data packet.

6. The method of claim 1, wherein transmitting the data packet on the unoccupied frequency resource blocks comprises transmitting a reservation sequence indicating a number of resource blocks occupied and transmitting a control information indicating a duration of the transmission.

7. The method of claim 1, wherein the time period is less than a duration of a slot.

8. The method of claim 1, wherein the time period is at least 2 symbols.

9. A user equipment (UE) for wireless communication, comprising:
a memory; and
at least one processor coupled to the memory and configured to:
determine to transmit a data packet in a portion of bandwidth;
select a listen before talk counter defining a time period to wait before beginning a transmission of the data packet;
sense, during the time period, the portion of bandwidth for transmissions of other UEs occupying frequency resource blocks within the portion of bandwidth;
detect a reservation sequence indicating a number of the frequency resource blocks occupied by another UE and decode control information indicating a duration that one of the other UEs is configured to occupy the frequency resource blocks;
select unoccupied frequency resource blocks within the portion of bandwidth based on the sensing; and
transmit the data packet on the unoccupied frequency resource blocks after the time period.

10. The UE of claim 9, wherein the at least one processor is configured to randomly select the listen before talk counter from among configured counters.

11. The UE of claim 9, wherein the at least one processor is configured to select the listen before talk counter based on a priority of the data packet.

12. The UE of claim 9, wherein the at least one processor is configured to transmit the data packet with a lower code rate than at least one of the transmissions of the other UEs.

13. The UE of claim 9, wherein the at least one processor is configured to select a number of contiguous resource blocks based on a size of the data packet.

14. The UE of claim 9, wherein the at least one processor is configured to transmit a reservation sequence indicating a number of resource blocks occupied and transmit a control information indicating a duration of the transmission.

15. The UE of claim 9, wherein the time period is less than a duration of a slot.

16. The UE of claim 9, wherein the time period is at least 2 symbols.

17. A user equipment (UE) for wireless communication, comprising:
means for determining, by the UE, to transmit a data packet in a portion of bandwidth;
means for selecting a listen before talk counter defining a time period to wait before beginning a transmission of the data packet;
means for sensing, during the time period, the portion of bandwidth for transmissions of other UEs occupying frequency resource blocks within the portion of bandwidth, wherein the means for sensing the portion of bandwidth during the time period is configured to detect a reservation sequence indicating a number of the frequency resource blocks occupied by another UE and to decode control information indicating a duration that one of the other UEs is configured to occupy the frequency resource blocks;
means for selecting unoccupied frequency resource blocks within the portion of bandwidth based on the sensing; and
means for transmitting the data packet on the unoccupied frequency resource blocks after the time period.

18. The UE of claim 17, wherein the means for selecting the listen before talk counter is configured to randomly select the listen before talk counter from among configured counters.

19. The UE of claim 17, wherein selecting the listen before talk counter is based on a priority of the data packet.

20. The UE of claim 17, wherein the means for transmitting the data packet on the unoccupied frequency resource blocks is configured to transmit the data packet with a lower code rate than at least one of the transmissions of the other UEs.

21. The UE of claim 17, wherein the means for selecting unoccupied frequency resource blocks is configured to select a number of contiguous resource blocks based on a size of the data packet.

22. The UE of claim 17, wherein the means for transmitting the data packet on the unoccupied frequency resource blocks is configured to transmit a reservation sequence indicating a number of resource blocks occupied and transmitting a control information indicating a duration of the transmission.

23. The UE of claim 17, wherein the time period is less than a duration of a slot.

24. A non-transitory computer-readable medium storing computer executable code executable by a processor of a user equipment (UE), comprising code to:
determine, at the UE, to transmit a data packet in a portion of bandwidth;
select a listen before talk counter defining a time period to wait before beginning a transmission of the data packet;
sense, during the time period, the portion of bandwidth for transmissions of other UEs occupying frequency resource blocks within the portion of bandwidth;
detect a reservation sequence indicating a number of the frequency resource blocks occupied by another UE and decode control information indicating a duration that one of the other UEs is configured to occupy the frequency resource blocks;
select unoccupied frequency resource blocks within the portion of bandwidth based on the sensing; and
transmit the data packet on the unoccupied frequency resource blocks after the time period.

* * * * *